J. PARR.
CRACKER-MACHINE.
No. 184,895. Patented Nov. 28, 1876.
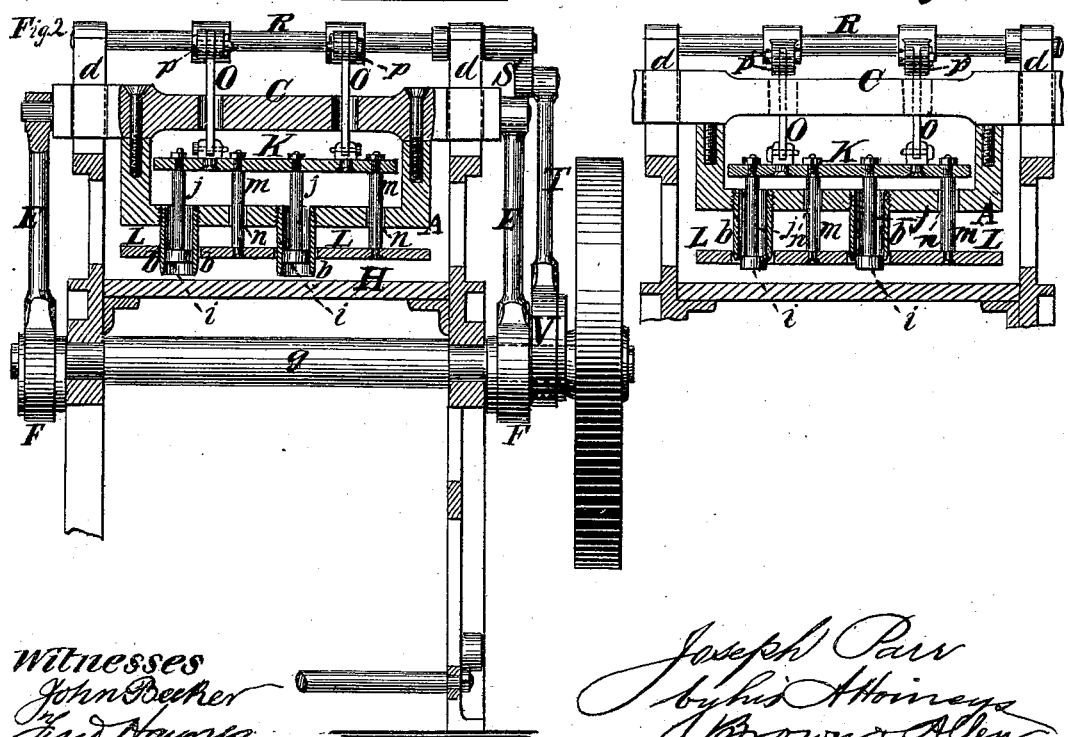

UNITED STATES PATENT OFFICE.

JOSEPH PARR, OF NEW YORK, N. Y., ASSIGNOR TO LYDIA ANN McCOLLUM, (AS SOLE EXECUTRIX AND TRUSTEE OF THE ESTATE OF JOHN McCOLLUM,) OF SAME PLACE.

IMPROVEMENT IN CRACKER-MACHINES.

Specification forming part of Letters Patent No. 184,895, dated November 28, 1876; application filed September 18, 1876.

*To all whom it may concern:*

Be it known that I, JOSEPH PARR, of the city, county, and State of New York, have invented an Improvement in Cracker-Machines; and I do hereby declare that the following is a full, clear, and exact description of the same, reference being had to the accompanying drawing, which forms part of this specification.

My invention relates to attachments for the cutters of cracker-machines; and it consists in an improved attachment for the cutter of a cracker-machine, whereby a positive differential movement is imparted to the plungers, which force the crackers, after being cut from the dough, out of the cutting-cups of the cutter, said positive differential movement also being imparted simultaneously to the platen, which strips off the scrap dough from the outside of the cups of the cutter, by which means important advantages are secured over other methods hitherto employed.

In the drawing, Figure 1 represents a side view of the middle section of a cracker-machine, comprising a cutter with my improved attachment. Fig. 2 is a partial section of the same on the line $x\ x$ in Fig. 1. Figs. 3 and 4 are detail views, showing, respectively, a side elevation and a vertical section of portions of the machine, which will be referred to in describing the operation of my invention.

A is the platen, to which the cutter-cups $b$ are attached. The platen A is attached to a cross-head, C, which reciprocates vertically in ways $d\ d$, being actuated by connecting-rods E and eccentrics F, attached to the shaft $g$, said shaft being preferably driven by a pulley and belt. (Not shown in the drawing.) In their downward motion said cups $b$ cut through the sheet of dough carried along by an endless apron passing over the bed H of the machine. Within the said cutter-cups $b$ are fitted plungers $i$, the stems $j$ of which are rigidly attached to a second cross-head, K, and the stripper-plate L, for stripping off the scrap dough from the outside of the aforesaid cups $b$, is also attached to the said cross-head K by the rods $m$. The rods $m$ pass through holes $n$ in the platen A, which holes act as guideways for the rods $m$, acting as guides for the cross-head K.

It will be seen that any vertical motion imparted to the cross-head K will also be simultaneously imparted to the stripper-plate L, and to the plungers $i$.

Vertical reciprocating motion is imparted to the cross-head K by short connecting-rods O, pivoted to the said cross-head, and also to the rocking arms $p$, rigidly attached to the rock-shaft R. The said rock-shaft R is oscillated by a crank-arm, S, keyed to said shaft, and by a connecting-rod, T, which is actuated by an eccentric, V, keyed to the shaft $g$.

The eccentrics F and the eccentric V are so adjusted on the said shaft $g$, as shown in Fig. 3, and in such relation to each other, that when the cups $b$ begin to move upward the plungers $i$ move very slowly, and, remaining down temporarily, protrude from said cups, as shown in Fig. 4, to expel the crackers from the inside of the said cups, after which the said plungers move upward with the said cutters, moving downward slowly when said cutters begin to descend, till the proper relative position for operating on the dough is again restored.

The scrap dough is freed from the outside of the cutter-cups $b$ by the downward movement of the stripper-plate L. But I do not strictly confine myself to the mechanism shown in the drawing, and hereinbefore described, for actuating the platen A with its attachments, and the cross-head K with its attachments, as the differential movement of these parts may be accomplished by differential gearing, cams, or eccentrics.

I claim—

1. The combination of the cutter-cups $b$ and plungers $i$, both arranged to operate in a differential relation to each other by a positive motion imparted by suitable gearing, substantially as described.

2. The combination of the shaft $g$, the eccentrics F and V, the eccentric rods or connections E and T, the rock-shaft R, the arms $p$, the plungers $i$, the stripper-plate L, and the cross-head C, with its attached cutter-cups $b$, substantially as and for the purposes described.

JOSEPH PARR.

Witnesses:
BENJAMIN W. HOFFMAN,
FRED. HAYNES.